United States Patent [19]

Rowen

[11] Patent Number: 4,688,665
[45] Date of Patent: Aug. 25, 1987

[54] APPARATUS FOR PREVENTING ENGINE STALL

[75] Inventor: Harold E. Rowen, Chillicothe, Ill.

[73] Assignee: Caterpillar Inc., Peoria, Ill.

[21] Appl. No.: 858,153

[22] Filed: May 1, 1986

[51] Int. Cl.$^4$ .................. B60K 41/02; F16D 25/11; F16D 43/284

[52] U.S. Cl. .................. 192/0.076; 192/85 F; 192/103 F; 192/105 C; 137/56; 440/86

[58] Field of Search .................. 192/0.076, 0.033, 51, 192/85 F, 87.15, 87.19, 103 A, 103 F, 103 FA, 105 C, 105 CP, 105 CS; 440/75, 86; 74/336.5, 404.5; 73/535, 550; 137/53, 56, 58

[56] References Cited

U.S. PATENT DOCUMENTS

| | | | |
|---|---|---|---|
| 1,958,303 | 5/1934 | Hayes | 74/336.5 |
| 2,588,140 | 3/1952 | McFarland et al. | 137/56 |
| 2,691,382 | 10/1954 | Frick | 137/53 |
| 2,762,384 | 9/1956 | Rosenberger | 137/56 |
| 2,894,492 | 7/1959 | Ziskal | 91/433 |
| 3,390,594 | 7/1968 | Gillespie | 74/732 |
| 3,431,929 | 3/1969 | Croswhite | 137/56 |
| 3,613,469 | 10/1971 | McRoberts et al. | 74/361 |
| 3,872,956 | 3/1975 | Her et al. | 192/85 F |
| 3,952,606 | 4/1976 | Schulz | 74/377 |
| 4,084,601 | 4/1978 | Rowen | 137/49 |
| 4,095,684 | 6/1978 | Rowen | 192/103 FA |
| 4,308,940 | 1/1982 | Cadee | 192/103 FA |
| 4,323,093 | 4/1982 | Whitney | 137/56 |

FOREIGN PATENT DOCUMENTS

| | | |
|---|---|---|
| 11908 | 6/1980 | European Pat. Off. |
| 870500 | 3/1953 | Fed. Rep. of Germany |
| 1249244 | 11/1960 | France |
| 1250735 | 12/1960 | France |
| 1492568 | 11/1977 | United Kingdom |
| 1496969 | 1/1978 | United Kingdom ......... 192/103 FA |
| 2151725 | 7/1985 | United Kingdom |

Primary Examiner—Rodney H. Bonck
Assistant Examiner—David A. Testardi
Attorney, Agent, or Firm—Kenneth A. Rhoads

[57] ABSTRACT

The invention relates to a control apparatus for a clutch disc assembly drivingly associated with an engine. Protection from engine stall resulting for inertia loads downstream of the engage clutch disc assembly instantaneously exceeding available engine torque involves sophisticated brakes, intricate sequence controls, and complicated internal clutch control valving. The present apparatus includes a control valve for controllably directing fluid pressure to the clutch disc assembly from a source of fluid pressure. A valve member reciprocally disposed in the control valve is continually urged in a first axial direction. A speed sensor associated with an input member driven by the engine urges the valve member in a direction opposite the first axial direction in response to a decrease in the rotational speed of the input member to a preselected angular velocity slipping the clutch disc assembly. Thus, the engine is protected from stall by limiting the torque load on the engine to a preselected maximum value while avoiding complexity and high cost. Furthermore, the apparatus is accessible for installation and service and is adaptable to existing systems.

13 Claims, 4 Drawing Figures

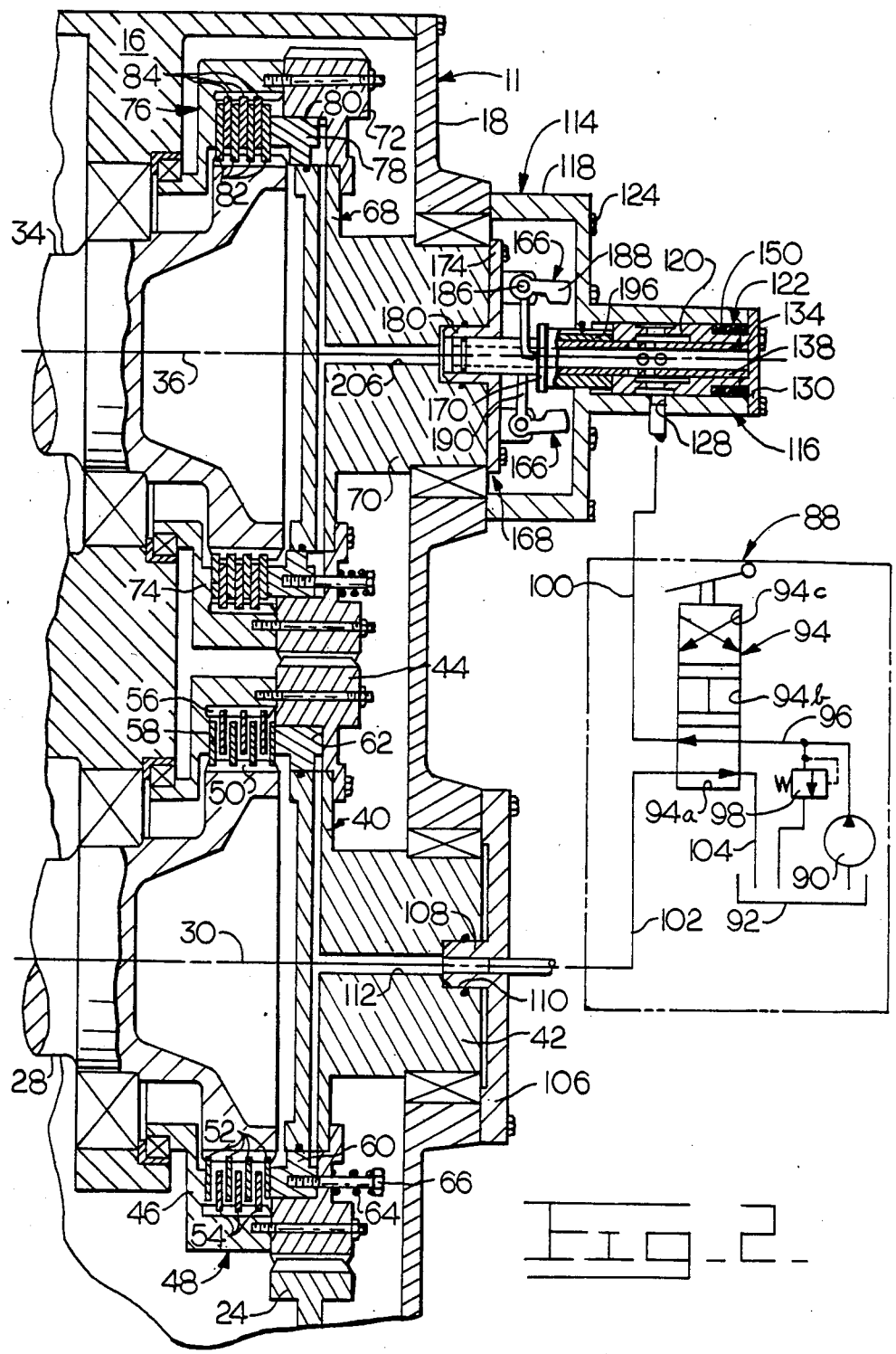
Fig_2

APPARATUS FOR PREVENTING ENGINE STALL

DESCRIPTION

1. Technical Field

This invention relates generally to an apparatus for preventing engine stall, and more particularly, to an apparatus for automatically progressively disengaging a clutch drivingly associated with an engine in response to a decrease in the rotational speed of the engine below a specified level.

2. Background Art

U.S Pat. No. 3,952,606 issued to G. W. Schulz on Apr. 27, 1976 is representative of a marine gear assembly for navigating ocean going vessels or the like. The marine gear assembly has gearing for speed reduction and torque amplification and a pair of hydraulically operated clutch disc assemblies for changing the direction of rotation of the output propeller shaft. When making a transient shift from forward to reverse, for example, the forward clutch disc assembly is disengaged, and the reverse clutch disc assembly is controllably engaged in a sequential manner so that the engine is not disconnected from the propeller shaft for any significant period of time.

In a cost conscious industry, a substantial savings can be realized by employing an economically priced, high speed, lightweight, low inertia engine in the propulsion system. However, if an abrupt reversal of the ship's forward motion is executed with such an engine, the inertia loads generated by the propeller, the propeller drive shaft and the marine gear reduction drive train downstream of the engaged reverse clutch disc assembly can instantaneously exceed the available engine torque. As a result, the engine speed decreases quickly to the engine stall point.

Prior art propulsion systems have not heretofore provided simple accessible, economical or retrofitable means to limit torque load on the engine to a preselected maximum value. Typically, the propulsion systems have various combinations of sophisticated variable pitch propellers, complex output shaft brakes, intricate external sequence controls and complicated internal clutch control valving within the marine gear assembly, all of which adds significantly to the initial purchase price of the propulsion system as well as creating difficult, time-consuming, and expensive service which increases operating expense. Another disadvantage of such systems is that they normally must be purchased at the time of initial installation of the propulsion system since it is very difficult or impossible to retrofit an existing system.

U.S. Pat. No. 3,390,594 issued to S. L. Gillespie on July 2, 1968 discloses an actuator that senses the output speed of the torque converter and automatically actuates the clutch in response to speed changes to maintain the converter unlocked at speeds below the selected range for lock up operation and disengages the clutch and restores converter operation in response to an increase in measured speed above the selected lockup range and to the initiation of a transmission shift. The speed sensor is overidden in response to attainment of a selected level for clutch actuation and shifts the clutch valve rapidly to a position in which the clutch actuating valve is wide open to obtain snap engagement of the clutch. Undesirably, the speed sensor does not sense engine speed directly which would result in inaccurate and delayed operation.

U.S. Pat. No. 3,613,469 issued to R. C. McRoberts, et al. on Oct. 19, 1971 is representative of one system for controlling clutch engagement during transient conditions of a directional shift. The system has centrifugally sensitive valves located at the output side of the clutch disc assemblies which are supplied with fluid as a result of the manual movement of a control lever by the operator. While a relatively constant output shaft speed may be obtained, the valving is not suitable for responding to rapidly changing transient conditions since the output valving device does not monitor or measure engine speed directly.

U.S. Pat. No. 3,872,956 issued to C. H. Herr, et al. on Mar. 25, 1975 discloses centrifugally sensitive valves located on the input side of the clutch disc assemblies. With the centrifugal valves located within the clutch units, the result is a complicated and expensive system that is not easily serviced and maintained.

U.S. Pat. No. 4,095,684 issued to H. E. Rowen on June 20, 1978 discloses a fluid control valve concentric with the input member. Clutch capacity is matched to available input torque by a rising fluid pressure generated by a centrifugal head of fluid in a chamber causing shifting of the valve, modulating fluid to the clutch. This arrangement is complex and has the disadvantage of being so integrated with the clutch construction as to not be readily accessible for maintenance. Moreover, it is not an arrangement that can be conveniently added to an existing package.

Another form of clutch control is disclosed in U.S. Pat. No. 4,084,601 issued to H. E. Rowen on Apr. 18, 1978 wherein a control valve is connected to the output of the transmission with a flywheel assembly serving as an output speed governor providing a feedback input to the control valve. Undesirably for an underspeed condition of the engine, the flow of fluid to the clutch is increased, increasing the capacity of the clutch and decreasing its slip to increase the speed of the output shaft.

Accordingly, what is needed is an improved control apparatus for the clutch of the marine gear assembly to be so constructed as to sense and be fully responsive to an instantaneous change in engine speed and effective in maintaining a preselected maximum torque load on the engine by slipping of the clutch and thus preventing engine stall. Preferably, the control apparatus must be simple and economical in construction and located where it can be easily installed and serviced. In addition, it should be adaptable to existing systems with a minimum amount of effort and expense.

The present invention is directed to overcoming one or more of the problems as set forth above.

DISCLOSURE OF THE INVENTION

In one aspect of the present invention, an apparatus for preventing stall of an engine is drivingly associated with a power train having a clutch disc assembly interposed between an input member driven by the engine and an output member arranged along a common axis and includes a control valve connected between a fluid pressure source and the clutch disc assembly. The control valve includes a valve member arranged along the common axis of the input and output members and having a passage in communication with the clutch disc assembly and means for continually urging the valve member in a first direction. Speed responsive means adapted to rotate at a constant ratio to the rotational speed of the engine urges the valve member in a direction opposite the first direction, controllably reducing the fluid pressure in the passage due to a decrease in the rotational speed of the input member to a specified angular velocity advantageously slipping the clutch assembly and maintaining a preselected maximum torque load on the engine.

During an abrupt reversal of a ship, for example, fluid pressure being directed to the actuation chamber of the reverse clutch disc assembly is automatically reduced to match the torque of the engine at a selected speed above the engine stall or stoppage point. A preselected maximum torque load on the engine is maintained by controlled slip of the reverse clutch disc assembly so that system demand does not exceed the capacity of the engine. Further, maximum engine torque at the preselected engine speed is maintained by the throttling of fluid pressure to the actuating chamber of the reverse clutch disc allowing inertia downstream of the reverse clutch disc assembly to be quickly overcome by slippage. The apparatus of the subject invention is responsive to instantaneous changes in engine speed and controllably reduces the fluid pressure to and from the reverse clutch disc assembly actuating chamber when the rotational speed of the engine decreases to a preselected angular velocity reduced. This permits controlled slip of the reverse clutch disc assembly and less power to be directed the propeller shaft while maintaining the speed of the engine above its stall point.

The apparatus is further readily accessible for service and maintenance, being removably secured external the marine gear assembly and arranged along the common axis of the input and output members. The apparatus also lends itself to the retrofitting of existing marine gear assemblies at minimum expense.

BRIEF DESCRIPTION OF THE DRAWINGS

FIG. 2 is an enlarged cross sectional view of a portion of FIG. 1 showing details of construction thereof;

BEST MODE FOR CARRYING OUT THE INVENTION

Figure 1:
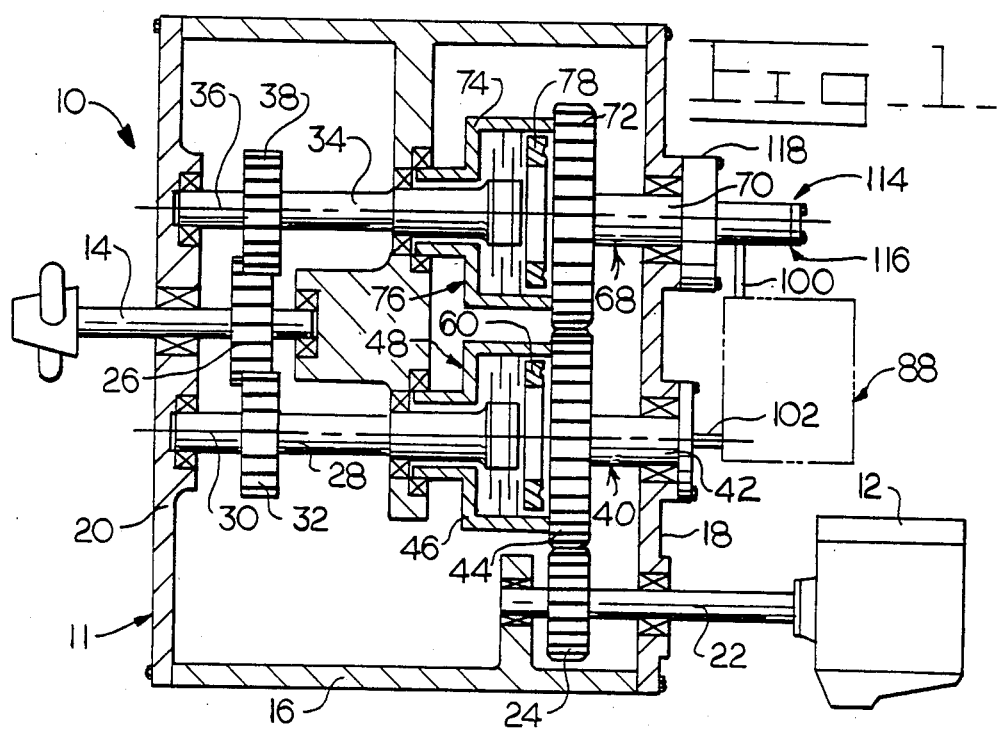
FIG. 1 is a diagrammatic view of a power train for a ship with the marine gear assembly, shown in section, and including the apparatus of the subject invention.

Referring to FIGS. 1 and 2 of the drawings, a power train 10 for a ship includes a marine gear assembly 11 coupled between an engine 12 and a propeller or output shaft 14. The engine may be, for example, of the relatively high speed, low inertia type, coupled to a marine gear assembly that provides a speed reduction and a corresponding torque amplification of 5 to 1 or greater. Such combinations would be typical for use in fishing trawlers or light tugs. The marine gear assembly may, for example, be structurally in the form disclosed in previously noted U.S. Pat. No. 3,952,606 and accordingly will be hereinafter described only to the extent necessary to understand the coaction of the present invention therewith.

The marine gear assembly 11 includes a case 16 having a front wall 18 and a rear wall 20. An input shaft 22 having an input drive gear 24 is journalled in the case and coupled directly to the engine 12. The propeller shaft 14 extends through the rear wall of the case and is journalled therein. A large output bull gear 26 rotates with the propeller shaft.

A forward drive countershaft output member 28 having a central axis 30 is journalled in the case 16 in parallel relationship to the input shaft 22 and the propeller shaft 14. A forward output gear 32 rotates with the countershaft 28 and is in constant engagement with the bull gear 26.

A reverse drive countershaft output member 34 having a central axis 36 is also journalled in the case 16 in parallel relationship to the input shaft 22 and the propeller shaft 14. A rear output gear 38 rotates with the countershaft and is also in constant engagement with the bull gear 26.

A forward drive input shaft member 40 has a hub end portion 42 journalled in the case 16, coaxial with the axis 30 of the countershaft 28. A forward drive gear 44 is connected to the input shaft member and engages the input drive gear 24. An annular member 46 is secured to the gear 44 and journalled in the case.

As best shown in FIG. 2, a pressure engaged, spring disengaged forward clutch disc assembly 48 is disposed in engageable-disengageable relation between the countershaft 28 and the gear 44. The forward periphery of countershaft 28 has an external spline 50 which is engaged by alternate ones of a plurality of annular clutch discs 52. An additional series of annular clutch plates 54 are alternated with the clutch discs and engage an internal spline 56 of the annular member 46. The annular member forms an end face 58 against which the clutch plates and clutch disc are axially compressed by a movement of an annular clutch piston 60 in a conforming actuation chamber 62 in the back surface of the gear 44. The clutch piston may be controlled for this purpose by admitting pressurized fluid into the chamber in a manner to be described later. In the absence of fluid pressure in the chamber, the clutch piston 60 is maintained in a fully disengaged condition by a plurality of peripherally located retraction springs 64, which urge the clutch piston away from the clutch disc 52 and clutch plates 54 by acting against the heads of a plurality of bolts 66 which are threaded in the clutch piston and through the springs.

A reverse drive input shaft member 68 has a hub end portion 70 journalled in the front wall 18 of the case 16 coaxial with the axis 36 of the countershaft 34. A reverse drive gear 72 is connected to the input member 68 and engages the gear 44. An annular member 74 is secured to the gear 72 and journalled in the case.

A pressure engaged, spring disengaged reverse clutch disc assembly 76 is disposed in engageable-disengageable relation between the countershaft 34 and the gear 72. The clutch disc assembly having a substantially identical construction to the forward clutch disc assembly 48 is formed in part by the gear 72, an annular clutch piston 78, an actuation chamber 80, and a plurality of clutch discs 82 and clutch plates 84. Because the reverse clutch disc assembly has an identical construction to the forward clutch disc assembly, it need not be described in detail.

A control system generally indicated at 88, and shown in more detail in FIG. 2, includes a source of pressurized fluid, such as an engine driven pump 90, which delivers fluid from a tank or reservoir 92 to a control valve 94 by way of a conduit 96. The control valve has three operating positions, a reverse drive position 94a, a neutral or center position 94b, and a forward drive position 94c. A relief valve 98 is connected to the conduit 96 to establish a predetermined maximum pressure in a conventional manner. Pressurized fluid is selectively directed from the control valve to either a fluid conduit 100 or a fluid conduit 102. In the reverse drive position of the control valve, pressurized fluid is directed to the fluid conduit 100 and the fluid from the conduit 102 is vented to the reservoir by way of a conduit 104 connected to the control valve. In the neutral position of the control valve, the conduits 100 and 102 and the fluid from the pump are vented to the reservoir by way of the conduit 104. In the forward drive position of the control valve, pressurized fluid is directed to the conduit 102 and the fluid from the conduit 100 is vented to the reservoir by way of the conduit 104.

An end cover plate 106 encloses the hub 42 of the input member 40 and is removably secured to the front wall 18 of the case 16. The plate has a pilot projection 108 which extends a short distance into an axial bore 110 in the hub 42. The conduit 102 is connected to a passage 112 that extends through the plate 106 and the pilot projection 108 thereof and then through the hub 42 to the actuation chamber 62 adjacent the back surface of the gear 44.

Figure 3:
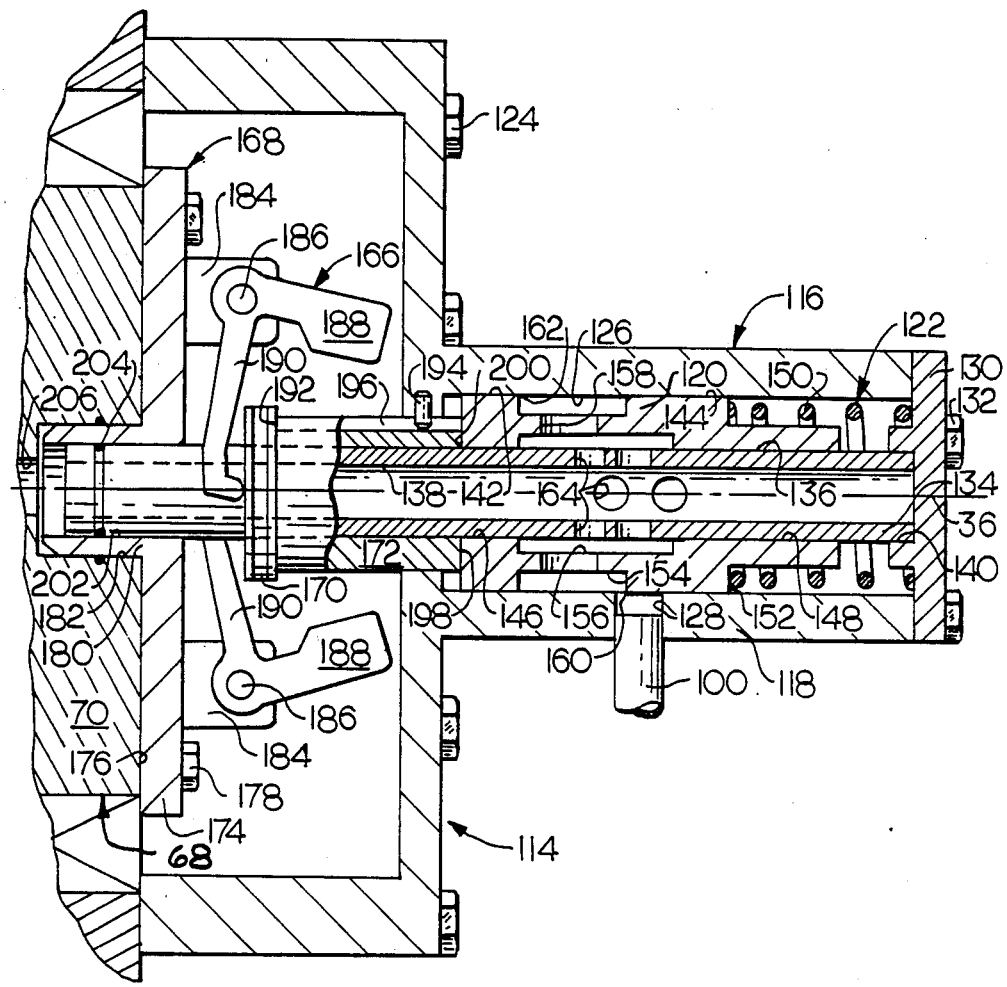
FIG. 3 is a further enlargement in section of the apparatus of the present invention.

As best shown in FIGS. 2 and 3, an apparatus 114 for preventing engine stall includes control valve means generally indicated at 116. The control valve means is located adjacent the hub 70 of the input member 68 and controllably directs fluid pressure to the actuating chamber 80 of the reverse clutch disc assembly 76. The control valve means includes a valve housing or body 118, a valve member or hollow spool 120 and resilient means 122 for continually urging the spool in a first axial direction or to the left when viewing the drawings. Body 118 is removably secured in an accessible manner to the front wall 18 of the case 16 by a plurality of peripheral bolts 124. An elongate bore 126 is defined within the body coaxially with the axis 36 and the spool is reciprocally disposed therein. A radial port 128 defined in the body extends to the bore 126 and is connected to conduit 100 from the control valve 94.

An end cap 130 is removably secured to the body 118 by a plurality of peripheral bolts 132 and closes the end of the bore 126. An elongate tubular member 134 having a cylindrical external surface 136 and an internal axial passage 138 is secured coaxially with the central axis 36 by an interference fit between the external surface and a shallow blind bore 140 of the cap.

The spool 120 defines a pair of external cylindrical lands 142,144 and a pair of internal cylindrical surfaces 146,148 which respectively mate with the bore 126 and the external surface 136 of the tubular member 134. Also, resilient means 122 includes a coiled compression spring 150 interposed between an annular seat 152 on the spool 120 and the end cap 130.

The spool 120 further has a radially outwardly opening circumferential groove 154 between the lands 142 and 144 and a radially inwardly opening circumferential groove 156 between the surfaces 146 and 148. A plurality of radial passages 158 defined in the spool interconnect the grooves 154 and 156. The groove 154 has an edge 160 which is adapted to cooperate with the port 128 in the body 118 to control the throttling of fluid pressure between the port and the groove. An opposite edge 162 of the groove 154 is located so that for all reciprocal positions of the spool 120, the edge will not overlap or block the port 128.

A plurality of radial apertures 164 defined in the tubular member 34 and located intermediate the ends thereof communicate fluid between the groove 156 of the spool 120 and the axial passage 138. The location of the apertures 164 are such that for all reciprocal positions of the spool 120, fluid may communicate freely between the groove 156 and the passage 138.

The apparatus 114 further includes speed sensing means generally designated 166, for sensing the rotational speed of the input member 68, urging the spool 120 in a direction opposite the first axial direction or to the right when viewing the drawings when the rotation speed of the input shaft member 68 increases. The speed sensing means includes a flyweight assembly 168, an annular thrust bearing 170, and a sleeve 172. The flyweight assembly 168 includes a flanged member 174 removably secured to an outer radial end surface 176 of the hub 70 of the rotatable input member 68 by a plurality of bolts 178. The flanged member has a pilot projection 180 which extends a short distance into an axial bore 182 in the end surface 176. A pair of brackets 184, integral with the flange member 174, each mount by means of a pivot 186, a flyweight 188 having an arm 190 slidably engagable with the thrust bearing 170. The flyweight assembly is directly sensing the rotation speed of the input member 68 and is adapted to rotate at the same speed of rotation as the input member and at a constant ratio to the rotational speed of the engine 12. By the term "directly sensing" it is meant that the speed sensitive portion, e.g. the flyweight assembly 168 of the speed sensing means 166, is connected for conjoint rotation with the input member 68. The thrust bearing, which is axially slidable on the external surface 136 of the tubular member 134, is in abutting engagement with an inner end surface 192 of the sleeve 172. The sleeve is also axially slidable on the surface 136 and is prevented from rotation by a radially inwardly projecting dowel 194 secured within the housing 118. The dowel engages an elongate axial slot 196 formed in the periphery of the sleeve 172. An outer end surface 198 of the sleeve is in abutting engagement with an inner end surface 200 of the spool 120.

An axial bore 202 defined in the flange member 174 is adapted to receive the inner end of the tubular member 134. A seal 204 is located between the axial bore and the external surface 136 of the tubular member. As best shown in FIG. 3, the passage 138 of the tubular member is in communication with a passage 206 that extends along the axes 36 of the input member 68 and then radially therein to the actuation chamber 80 adjacent the back surface of the reverse drive gear 72.

Figure 4:
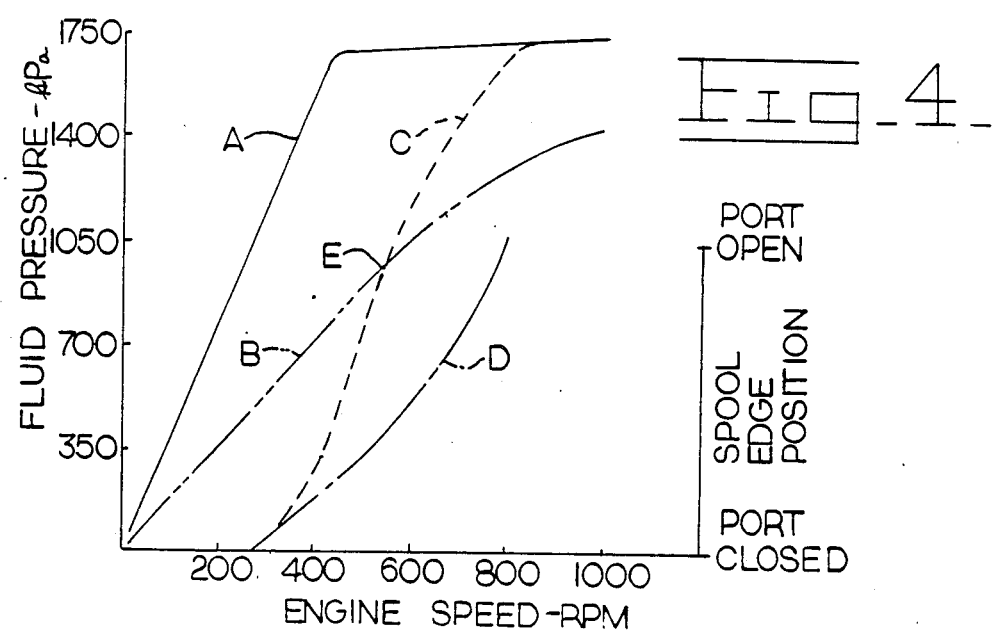
FIG. 4 is a graph showing a plurality of curves illustrating certain operating parameters in accordance with the present invention.

FIG. 4 is a graph showing a plurality of curves illustrating operating parameters typical for an apparatus constructed in accordance with the subject invention. The curve identified by the letter A is an example of the fluid pressure in kilopascal (kPa) available at port 128 of the body 118 from pump 90 for various angular velocities or speeds of the engine 12 in rpm.

The curve identified by the letter B illustrates an example of the fluid pressure in kilopascal (kPa) required in the chamber 80 of clutch disc assembly 76 to match the torque of the engine 12 for a given angular velocity or speed of the engine in rpm.

The curve identified by the letter C is an example of the fluid pressure in kilopascal (kPa) in the chamber 80 of the clutch disc assembly 76 resulting from the throttling of fluid pressure between the edge 160 of the spool 120 and the port 128 of the body 118 for a preselected angular velocity or speed of the engine 12 in rpm.

The curve identified by the letter D illustrates an example of the relative position of the edge 160 of the spool 120 to the port 128 of the body 118 for a preselected angular velocity or speed of the engine 12 in rpm.

The intersection point identified by the letter E of the curve B by curve C is the control or slip point of the clutch disc assembly 76 for the given example.

INDUSTRIAL APPLICABILITY

The apparatus 114 of the present invention is particularly adaptable to marine gear assemblies in the power train of ocean going vessels or the like.

In operation, referring to FIGS. 1 and 2, when one of the clutch disc assemblies 48 or 76 is engaged, the other of the clutch disc assemblies is disengaged. The fluid pressure directed to either of the clutch disc assemblies from the pump 90 is being continually exhausted through internal leakage and must be continually replenished by the pump in order to maintain a drive through the clutch disc assemblies. It is well known to one skilled in the art that cylindrically fit members that are subjected to pressurized fluid will inherently leak. In the subject arrangement, operating clearances provided between the movable components of the clutch disc assemblies are such that internal leakage or drain can and does occur.

Shifting of the control valve 94 to the neutral position 94b results in the actuation chambers 62 and 80 for each of the clutch disc assemblies 48 and 76 to be vented to the reservoir 92 along with the fluid from the pump 90. When this occurs, powered drive of the propeller shaft 14 is interrupted.

Shifting of control valve 94 to its forward drive position 94c directs pressurized fluid from pump 90 to actuation chamber 62 in the back surface of gear 44. This causes axial movement of piston 60 and the clamping together of the interleaved clutch disc 52 and clutch plates 54 and consequent engagement of the clutch disc assembly 48. Engagement of the clutch disc assembly 48 causes the output countershaft 28 to rotate with the input member 40 transmitting power from the engine driven shaft 22 to the propeller output shaft 14 by way of the input drive gear 24 driving the forward drive transfer gear 44 and the forward output gear 32 driving the bull gear 26.

Shifting of the control valve 94 to its reverse or astern drive position 94a directs pressurized fluid from the pump 90 by way of the apparatus 114 to the actuation chamber 80 in the back surface of gear 72 in a controlled manner responsive to the rotational speed of the engine 12. This causes axial movement of the piston 78 and the clamping together of the interleaved clutch disc 82 and clutch plates 84 and consequent engagement of the clutch disc assembly 76. Engagement of the clutch disc assembly 76 causes the countershaft member 34 to rotate with the input member 68 transmitting power from the engine driven shaft 22 to the propeller shaft 14 by way of the forward drive transfer gear 44 driving the reverse drive transfer gear 72 and the rearward drive output gear 38 driving the bull gear 26.

The interposing of the forward drive transfer gear 44 between the gear 24 and the reverse drive gear 12 causes rotation of the reverse drive gear and the input member 68 to be reversed to the rotation of the engine input shaft 22.

With the gear 24 of the input shaft 22 in constant mesh with the gear 44 and the gear 44 in constant mesh with the gear 72, the rotational speed of the input members 40 and 68 are at a preselected constant ratio to the rotation speed of the engine 12.

Referring to FIGS. 2 and 3, the flyweight assembly 168 of the speed sensing means 166 is adapted to rotate in unison with the input member 68 and is responsive to instantaneous changes in the rotational speed of the engine 12. The speed sensing means serves as a feedback input to the axially aligned spool 120 for a given speed of the input member.

Those skilled in the art will recognize that the more rapid the rate of rotation of the input member 68, the greater the centrifugal force generated in the flyweight assembly 168. As a consequence, the flyweights 188 will tend to move outward of the axis 36 of the input member 68 and the arms 190 will move to the right when reviewing the drawing, to urge the thrust bearing 170, sleeve 172 and the spool 120 of the control valve means 116 against the bias of the coil spring 150.

The shifting of the spool 120 to the right establishes fluid communication between the port 128 and the passages 138 and 206 and the chamber 80. Dependent upon the rotational speed of the input member 68, a throttling of the fluid pressure to the chamber will occur to a greater or lesser degree at the interface of the bore 126 and spool, by cooperation of the edge 160 and the land 144 with the port.

In the graph of FIG. 4, the curve identified by the letter A is an example of the relationship between the fluid pressure in kilopascal (kPa) available from the pump 90 to the port 128 of the control valve means 116 for various speeds of the engine 12 in rpm.

At a given speed, the engine 12 develops a fixed torque output. The curve identified by the letter B illustrates an example of the relationship of fluid pressure in kilopascal (kPa) required in the chamber 80 of the clutch disc assembly 76 to match the torque from the engine for a given engine speed in rpm. From a comparison of curves A and B, it is noted that the fluid pressure available at the port 128 is always greater than the required fluid pressure to match the torque from the engine at all engine speeds.

The fluid pressure in kilopascal (kPa) resulting from throttling at a given engine speed in rpm is depicted by the curve identified by the letter C. In this example, the curve is generated by the inertia of the flyweight assembly 168 overcoming the first axial direction bias of the coil spring 150, moving the edge 160 of the spool 120 relative to port 128 to begin the throttling of fluid pressure to the chamber 80 of the clutch disc assembly 76 to replenish fluid exhausted from the chamber 80 due to internal leakage between the moving components resulting from operating clearances.

The curve identified by the letter D illustrates the relative position of the edge 160 of the spool 120 to the port 128 for a preselected angular velocity or speed of the engine 12 in rpm. In this example, the throttling begins at approximately 240 rpm of the engine or engine startup and ends at approximately 800 rpm of the engine whereupon the port 128 is fully open and maximum available fluid pressure from pump 90 is directed to the clutch disc assembly 76.

The intersection of the curves B and C, as identified at E, is the control or slip point of the clutch disc assembly 76, and is the point that the fluid pressure in the chamber 80 of the clutch disc assembly 76 resulting from throttling matches the available torque from the engine 12 for the given angular velocity of the engine. Any amount of fluid pressure below the control point E is insufficient to maintain the clutch disc assembly completely engaged. The intersection point E of curve B by curve C is established at approximately 540 rpm of the engine 12 in the given example, which is above the engine stall point.

When an abrupt shift of the control valve 94 is executed from the forward drive position 94c to the reverse drive position 94c, as might occur during a hard reversal, results in maximum available fluid pressure from pump 90 being directed to the chamber 80 of the clutch disc assembly 76. This fully engages the clutch assembly because the spool 120 has been shifted to the right as viewed in FIG. 3 under the influence of rapidly rotating sensing means 166 directing unrestricted fluid pressure from the port 128 to the passages 138 and 206 and the chamber. The immediate engagement of the reverse clutch assembly 76 lugs the engine 12 due to the high inertia loads generated by the propeller, the propeller shaft 14, and the drive train downstream of the reverse clutch assembly 76 quickly exceeding the torque capacity of the engine.

The speed sensing means 166 directly sensing the rotational speed of the input member 68 responds immediately to the lugging of the engine 12, and as the rotational speed of the input member decreases, the coil spring 150 will move spool 120 to the left as viewed in FIG. 3 against the reduced bias applied by the slowed flyweight assembly 168 whereupon at a specified angular velocity throttling back the fluid pressure to the actuation chamber 80 of the clutch disc assembly 76. This is accomplished by the land 144 of the spool 120 overlapping and partially blocking the port 128 as shown in FIG. 3. As a result of the throttling back of fluid pressure to the actuation chamber 80, the rotational speed of the engine is maintained at an established control or slip point E that matches the engine torque above engine stall. This happens because any further throttling of fluid pressure to the chamber 80 increases slippage of the clutch disc assembly which would automatically reduce the torque load on the engine and allow the engine to increase in speed. However, as the speed increases, the fluid pressure to the chamber 80 would increase reducing or eliminating slippage which again increases the torque load on the engine. At this slip point excessive inertial energy will be quickly absorbed by the slippage. As the inertia is absorbed and dissipated, the engine will recover to full rotational speed and power, and the clutch disc assembly will be completely engaged.

The operating characteristics of the apparatus 114 and the resulting fluid pressure from throttling for a given angular velocity or speed of the engine 12 can be tailored to match various engine and marine gear assembly combinations by the altering of, for example, the inertia of the flyweight assembly 166, the bias of the coil spring 15, the location of the edge 160 and land 144 on the spool 120, and the location and/or the diameter of port 128. All of these alternations can be accomplished quickly and easily to existing marine gear assemblies by the easy removal of the body 118 from the case 16 and the substitution of one or more of the components as required.

From the foregoing, it will be appreciated that the subject invention provides a simple, readily accessible and economical control apparatus 114 for the reverse drive clutch disc assembly 76 of a marine gear assembly 11, for example, to alter its capacity and its slip appropriately, thus protecting the driving engine 12 from stoppage in an abrupt reversal situation. The apparatus is removably secured to the case 16 of the marine gear assembly 11, senses the speed of the input member 68, and is responsive to instantaneous changes in the rotational speed of the engine. The apparatus 114 is effective in maintaining a preselected maximum torque load on the engine by the throttling of fluid pressure to the reverse drive clutch disc assembly 76. The present invention allows the rapid shifting of the control valve 94 from the forward drive position 94c to the reverse drive position 94a. The immediate disconnection of the forward drive clutch disc assembly 48 is followed by a desirable, automatic, smooth and controlled engagement of the reverse drive clutch disc assembly 76 maintaining the angular velocity or rotational speed of the engine at an established control or slip point, thus maintaining the torque load on the engine to a preselected maximum value. Excess inertia in the drive train downstream of the reverse drive clutch disc assembly is absorbed by slippage, thus allowing the engine to recover to full governed speed and power.

It is also recognized that a similar apparatus 114 could be simply and economically adapted to the forward drive disc clutch assembly 48 if desired.

Other aspects, objects and advantages can be obtained from a study of the drawings, the disclosure and the appended claims.

I claim:

1. An apparatus for preventing the stall of an engine drivingly associated with a power train including a fluid pressure source and a fluid pressure engaged, spring disengaged clutch disc assembly having an input member driven by the engine and an output member arranged along a central axis, comprising:

control valve means for controllably directing fluid pressure to an actuator of the clutch disc assembly from the source and including a body having a bore arranged along the axis, a valve member reciprocally disposed in the bore, and means for continually urging the valve member in a first axial direction; and speed sensing means for sensing the rotational speed of the input member, urging the valve member in a direction opposite the first axial direction controllably throttling the fluid pressure to the actuator of the clutch disc assembly in response to a decrease in the rotational speed of the input member to a preselected angular velocity, slipping the clutch disc assembly, and limiting the torque load on the engine to a preselected maximum value.

2. The apparatus of claim 1 wherein the power train includes a case, the input member has an end portion journalled in the case, and the control valve means is removably secured to the case adjacent the end portion for accessibility.

3. The apparatus of claim 1 wherein the means for continually urging the valve member in a first axial direction is a resilient spring.

4. The apparatus of claim 1 wherein the body has a port extending to the bore and in communication with the fluid pressure source, and said valve member has a pair of external cylindrical lands separated by an outwardly opening groove, a pair of internal cylindrical surfaces separated by a radially inwardly opening groove, a passage interconnecting the grooves, and the lands and the outwardly opening groove adapted to cooperate with the port to controllably throttle fluid delivery to the clutch disc assembly.

5. The apparatus of claim 1 wherein the valve has a pair of internal cylindrical surfaces separated by a radially inwardly opening groove and the control valve means includes an elongate tubular member having a cylindrical external surface, a plurality of radial apertures, and an internal axial passage, the tubular member being secured along the axis with the cylindrical external surface in mating relationship with the pair of the internal cylindrical surfaces of the valve member and the plurality of radial apertures in communcation with the radially inwardly opening circumferential groove.

6. The apparatus of claim 1 wherein the speed sensing means includes a flyweight assembly, a thrust bearing, and a sleeve in force transmitting relationship with the valve member.

7. The apparatus of claim 6 wherein the flyweight assembly is removably secured to the input member.

8. An apparatus for preventing the stall of an engine adapted to be connected, in use, to a marine gear assembly including a fluid pressure source and a fluid pressure engaged, spring disengaged clutch disc assembly having an input member driven by the engine and an output member arranged along a central axis, comprising:

control valve means for controlling throttling fluid pressure to the clutch disc assembly from the source and including a body having a bore and a port extending to the bore and in communication with the fluid pressure, a valve member reciprocally disposed in the bore and having a pair of external cylindrical lands separated by an outwardly opening groove, a pair of inernal cylindrical surfaces separated by a radially inwardly opening groove, a passage interconnecting the grooves, the lands and the outwardly opening groove are adapted to cooperate with the port to controllably throttle fluid delivery to the clutch disc assembly, and means for continually urging the valve member in a first axial direction; and speed sensing means for sensing the rotational speed of the input member, urging the valve member in a direction opposite the first axial direction and controllably throttling the fluid pessure to the clutch disc assembly in response to a decrease in the rotational speed of the input mmber to a preselected angular velocity, slipping the clutch disc assembly, and limiting the torque load on the engine from the output member to a preselected maximum value.

9. The apparatus of claim 8 wherien the marine gear assembly includes a case, the input member has an end portion journalled in the case, and the control valve means is removably secured to the case adjacent the end portion for accessibility.

10. The apparatus of claim 8 wherein the means for continually urging the valve member in a first axial direction is a resilient spring.

11. The apparatus of claim 8 wherein the control valve means includes an elongate tubular member having a cylindrical external surface, a plurality of radial apertures, and an internal axial passage, the tubular member being secured along the axis with the cylindrical external surface in mating relationship with the pair of the internal cylindrical surfaces of the valve member and the plurality of radial apertures in communication with the radially inwardly opening circumferential groove.

12. The apparatus of claim 8 wherein the speed senssing means includes a flyweight assembly connected for conjoint rotation with the input member.

13. The apparatus of claim 12 wherein the flyweight assembly further includes a thrust bearing and a sleeve in force transmitting relationship with the valve member.

* * * * *

UNITED STATES PATENT AND TRADEMARK OFFICE
CERTIFICATE OF CORRECTION

PATENT NO. : 4,688,665

DATED : August 25, 1987

INVENTOR(S) : Harold E. Rowen

It is certified that error appears in the above-identified patent and that said Letters Patent is hereby corrected as shown below:

Column 11, line 4, following "valve" add --member--.

Column 11, line 27, "controlling" should be --controllably--.

Signed and Sealed this

First Day of March, 1988

Attest:

DONALD J. QUIGG

Attesting Officer

Commissioner of Patents and Trademarks